(12) United States Patent
Simon et al.

(10) Patent No.: US 10,137,748 B2
(45) Date of Patent: Nov. 27, 2018

(54) VEHICLE WHEEL SUSPENSION

(71) Applicant: Ford Global Technologies, LLC, Dearborn, MI (US)

(72) Inventors: Marc Simon, Köln (DE); Thomas Gerhards, Niederzier (DE); Paul Zandbergen, Würselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/094,194

(22) Filed: Apr. 8, 2016

(65) Prior Publication Data
US 2016/0297269 A1 Oct. 13, 2016

(30) Foreign Application Priority Data
Apr. 10, 2015 (DE) ......................... 10 2015 206 443

(51) Int. Cl.
*B60G 3/20* (2006.01)
*B60G 3/06* (2006.01)
*B60G 7/00* (2006.01)

(52) U.S. Cl.
CPC ............... *B60G 3/20* (2013.01); *B60G 3/06* (2013.01); *B60G 7/008* (2013.01); *B60G 2200/1424* (2013.01); *B60G 2200/154* (2013.01); *B60G 2200/17* (2013.01); *B60G 2200/18* (2013.01); *B60G 2206/122* (2013.01)

(58) Field of Classification Search
CPC ... B60G 3/20; B60G 3/04; B60G 3/06; B60G 2200/17; B60G 2200/154; B60G 2200/18; B60G 2200/142; B60G 2200/1442; B60G 2200/1424; B60G 2200/14; B60G 7/008; B60G 2204/148; B60G 2204/422

USPC ............... 280/124.135, 124.134, 124.145
See application file for complete search history.

(56) References Cited

U.S. PATENT DOCUMENTS

| 4,591,184 A | * | 5/1986 | Matschinsky | ............ B60G 3/20 |
| | | | | 280/124.141 |
| 5,560,651 A | * | 10/1996 | Kami | ....................... B60G 3/20 |
| | | | | 180/296 |
| 8,205,900 B1 | | 6/2012 | Moravy et al. | |

FOREIGN PATENT DOCUMENTS

| DE | 3148726 C1 | * | 7/1983 | ............ B60G 3/26 |
| EP | 0306625 A2 | * | 3/1989 | ............ B60G 3/20 |
| EP | 0312649 A2 | | 4/1989 | |
| FR | 2663266 A1 | | 12/1991 | |
| FR | 2681291 A1 | | 3/1993 | |

(Continued)

*Primary Examiner* — Keith J Frisby
(74) *Attorney, Agent, or Firm* — Raymond L. Coppiellie; Burgess Law Office, PLLC

(57) ABSTRACT

A wheel suspension for a vehicle including a carrier having a rotatably mounted bearing element. A spring damper strut connects to the carrier and the vehicle structure. A transverse control arm connects to the carrier at one end and at the other end to the vehicle structure. A control member connects to the carrier and the transverse control arm. The control member arranged relative to the transverse control arm such that a force application line of the control member is inclined toward a transverse control arm axis defined by a point of articulation of the transverse control arm on the structure side and a point of articulation of the transverse control arm on the carrier side wherein the force application line and the transverse control arm axis intersect between the points of articulation of the transverse control arm on the structure side and the carrier side.

14 Claims, 6 Drawing Sheets

(56) References Cited

FOREIGN PATENT DOCUMENTS

| | | | | |
|---|---|---|---|---|
| JP | S63176709 | * | 7/1988 | ............. B60G 7/008 |
| JP | S63176709 A | | 7/1988 | |
| WO | WO2005023569 A1 | | 3/2005 | |

* cited by examiner

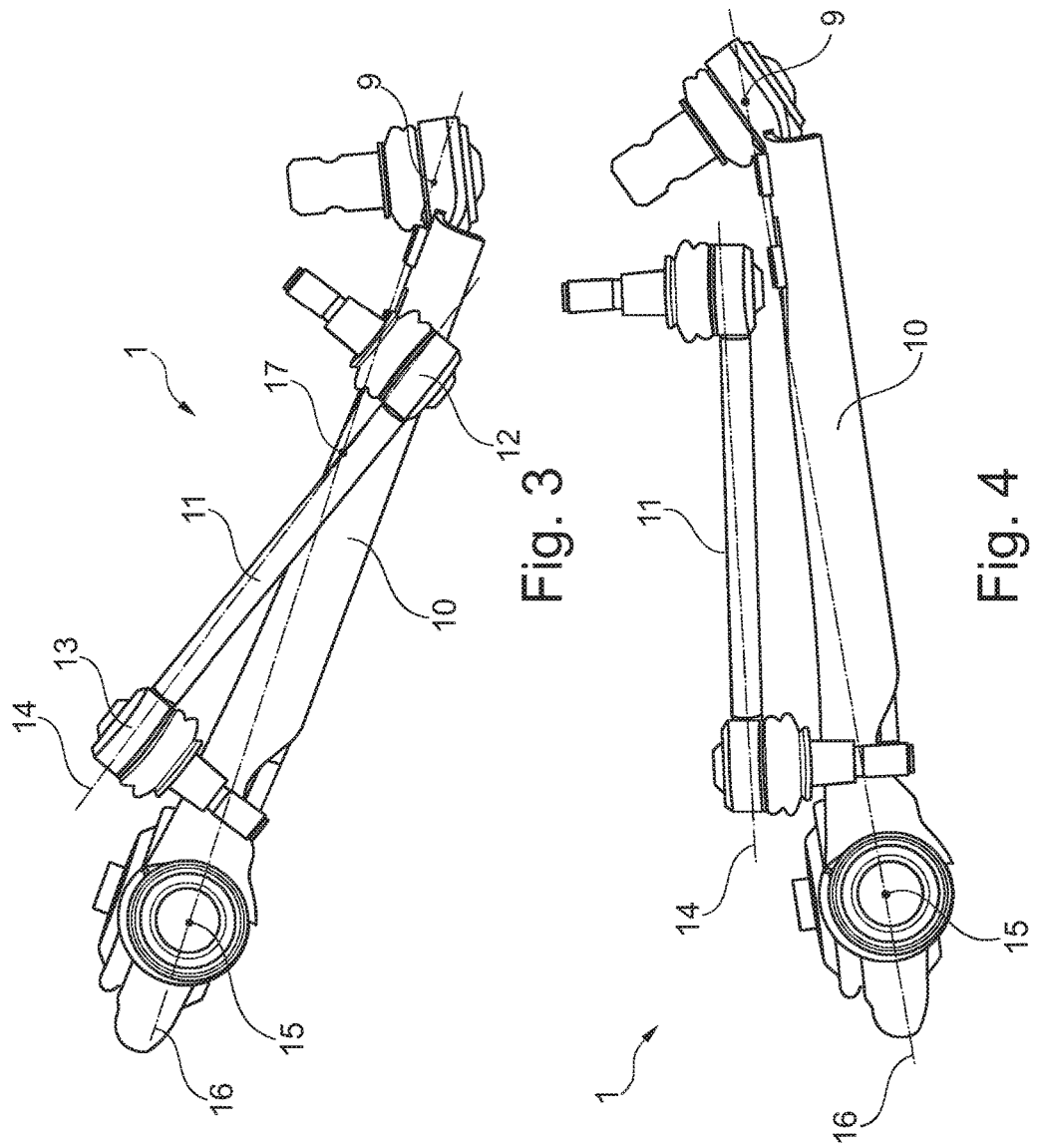

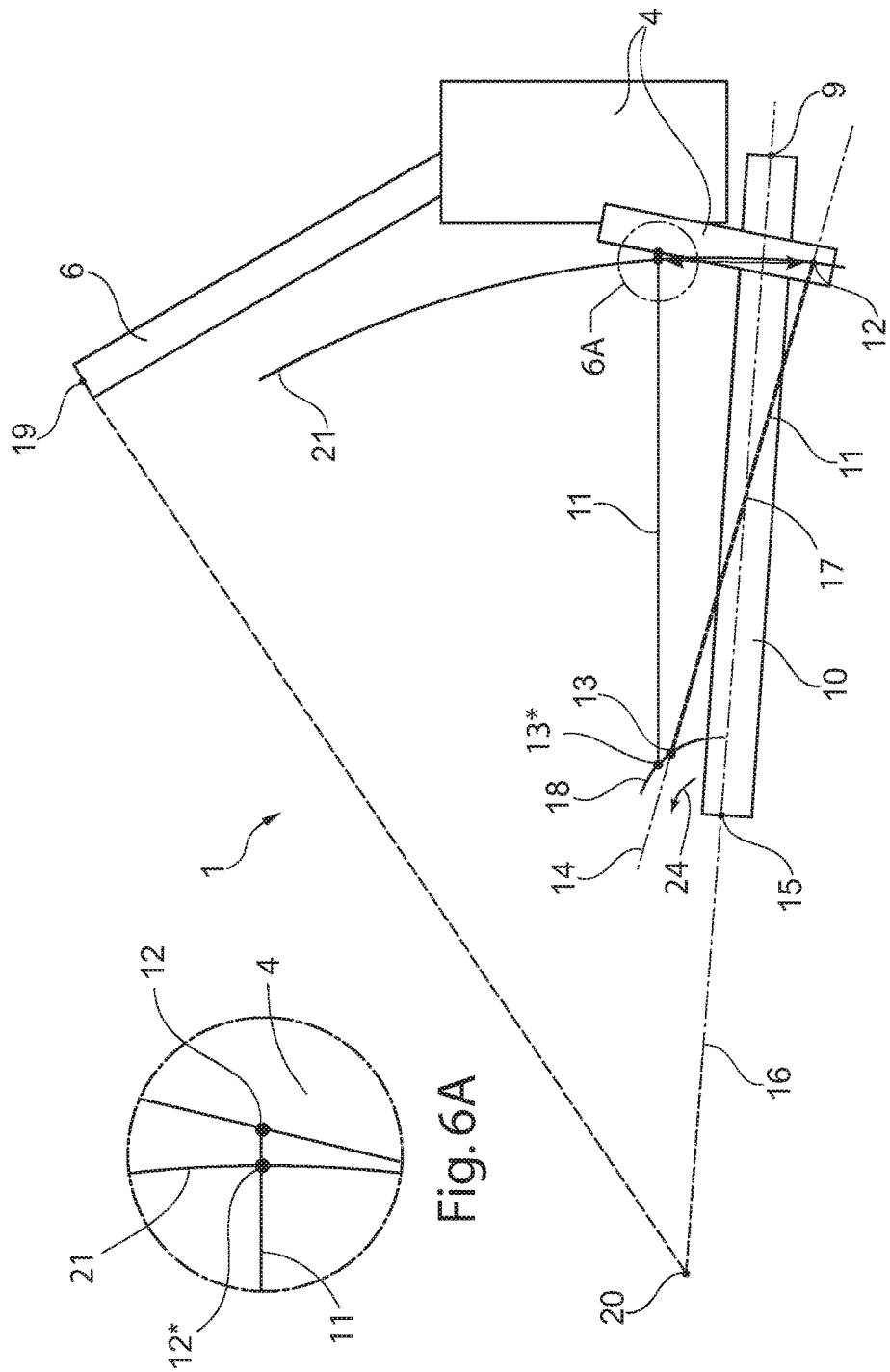

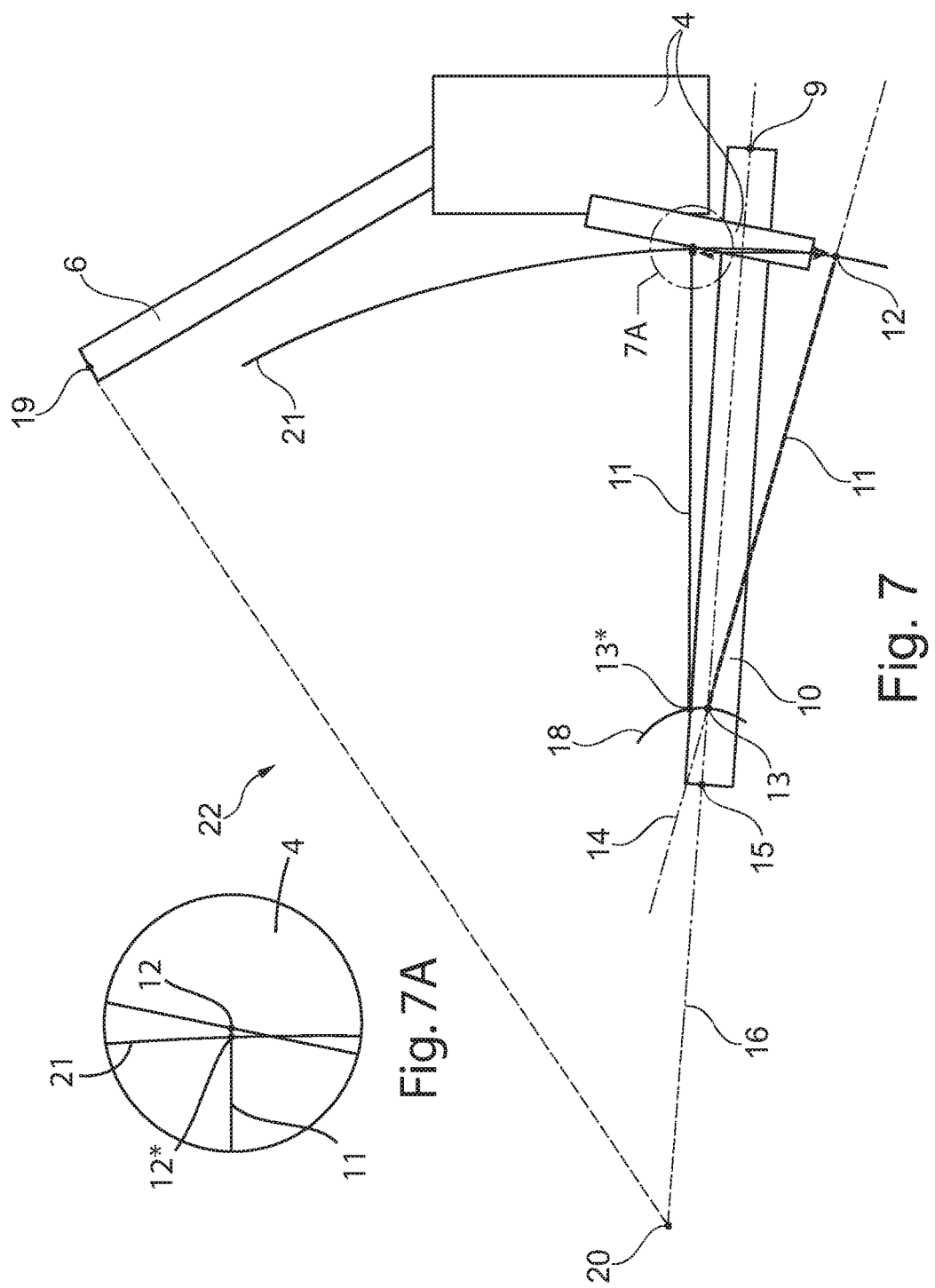

VEHICLE WHEEL SUSPENSION

CROSS-REFERENCE TO RELATED APPLICATIONS

Not Applicable.

BACKGROUND OF THE INVENTION

1. Field of the Invention

The present invention relates to a wheel suspension for a motor vehicle; and, more specifically, a wheel suspension including a carrier and a control arm.

2. Description of Related Art

A vehicle wheel suspension generally includes a wheel rotatably mounted on a bearing element. The bearing element is rotatably mounted on a carrier, wherein the rotational axis of the bearing element extends substantially vertical near the wheel center when the wheel suspension is fastened to the vehicle. A spring damper strut and lower transverse control arm support the carrier on the vehicle structure. Rotatably mounting the bearing element on the carrier establishes a steering axis of rotation adapted to the vertical relative to the road plane. The steering axis of rotation defined by the bearing element and the carrier extends substantially closer to the wheel center, whereby the so-called "torque steer effect," which describes an undesirable self-steering behavior of the vehicle axle at high acceleration, may be markedly reduced. To reduce rotation of the unit formed from the carrier and the spring damper strut, an additional control arm, connected to the carrier at one end and at the other end to the transverse control arm reduces relative rotation between the transverse control arm and the carrier and spring damper strut.

SUMMARY OF THE INVENTION

One example of the present invention includes a wheel suspension for a vehicle, in particular a motor vehicle. The wheel suspension includes a transverse control arm having first and second points of articulation and a control arm axis extending between the first and second points of articulation. A control member having a force application line extending between first and second ends of the control member has the first end located on one side of the control arm axis and the second end located on the opposite side thereof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 illustrates a partial front view of the wheel suspension of FIG. 1 in a spring rebound position.

FIG. 4 illustrates a partial front view of the wheel suspension of FIG. 1 in a spring compression position.

FIG. 6 illustrates a schematic, kinematic view of the wheel suspension of FIG. 1 during a spring compression movement.

FIG. 6a is an enlarged view of the wheel suspension of FIG. 6 taken in the circle 6a of FIG. 6.

FIG. 7 illustrates a schematic, kinematic view of a second exemplary embodiment of a wheel suspension according to the invention during a spring compression movement.

FIG. 7a is an enlarged view of the wheel suspension of FIG. 7 taken in the circle 7a of FIG. 7.

DETAILED DESCRIPTION OF THE PREFERRED EMBODIMENTS

The following description of the preferred embodiment(s) is merely exemplary in nature and is in no way intended to limit the invention, its application, or uses.

Figure 1:
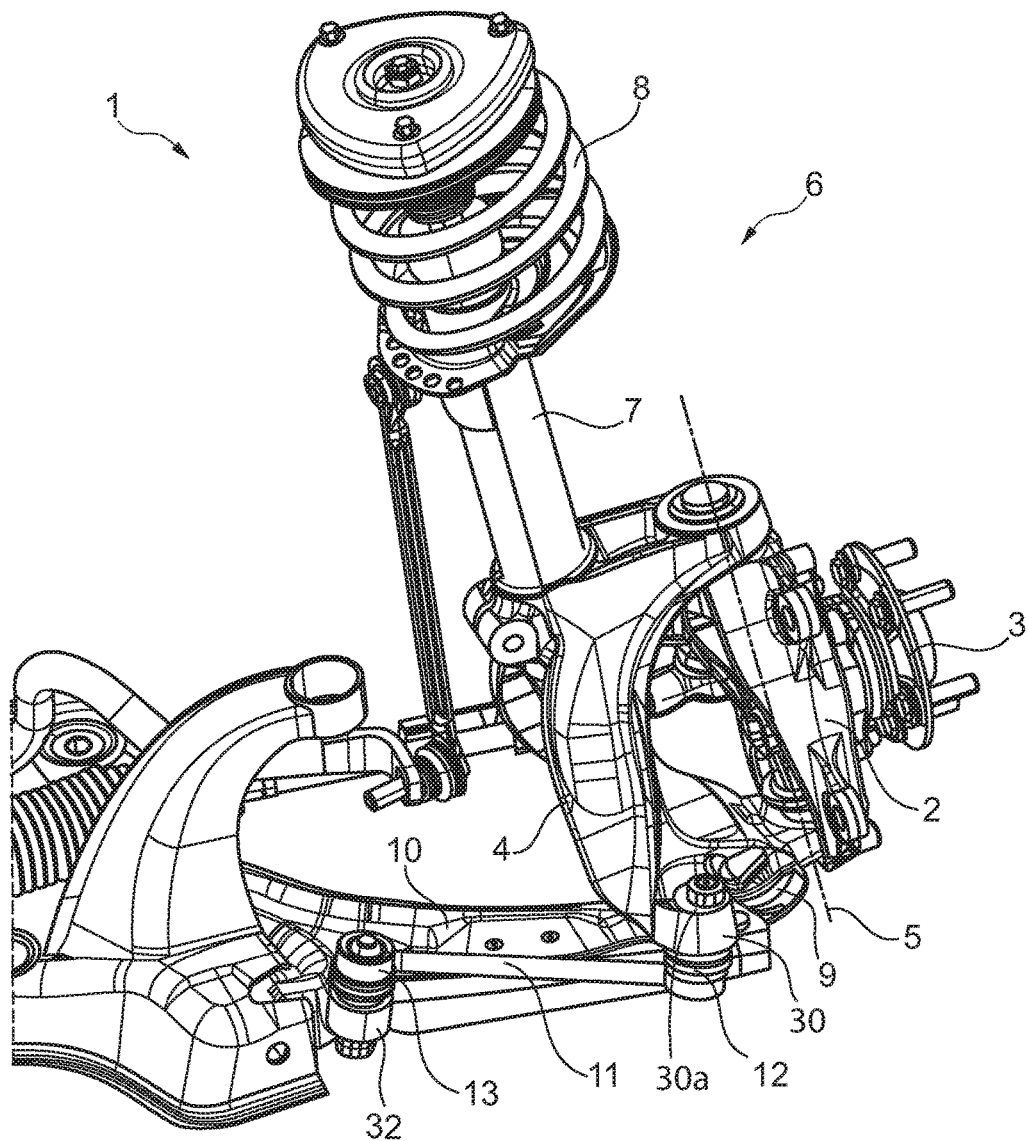
FIG. 1 illustrates a perspective view of a first exemplary embodiment of a wheel suspension according to the invention.

FIG. 1 illustrates a perspective view of a first exemplary embodiment of a wheel suspension for a vehicle, seen generally at 1. The wheel suspension 1 is shown for the left-hand front wheel (not illustrated) rotatably mounted by the wheel suspension 1 and viewed from the front and obliquely from above. The description of the wheel suspension 1 is not limited to the left-hand vehicle side but applies equally to a wheel suspension for the right-hand vehicle side. All embodiments of the wheel suspension according to the invention apply equally to both vehicle sides.

As shown, the wheel suspension 1 includes a bearing element 2 and wheel hub 3. The wheel 3 rotatably supports a wheel, not shown. The wheel suspension 1 further includes a carrier 4. The bearing element 2 rotatably mounted on the carrier 4 about a substantially vertical steering axis of rotation 5. The wheel suspension 1 also includes a spring damper strut, seen generally at 6, connected at its lower end to an upper portion of the carrier 4, and supported at its upper end on a vehicle structure, not shown. The spring damper strut 6 generally including a shock absorber 7 and a coil spring 8. Within the meaning of the present invention, "spring damper strut" is understood as a conventional structural unit including a spring, in particular a coil spring, and a shock absorber.

Figure 2:
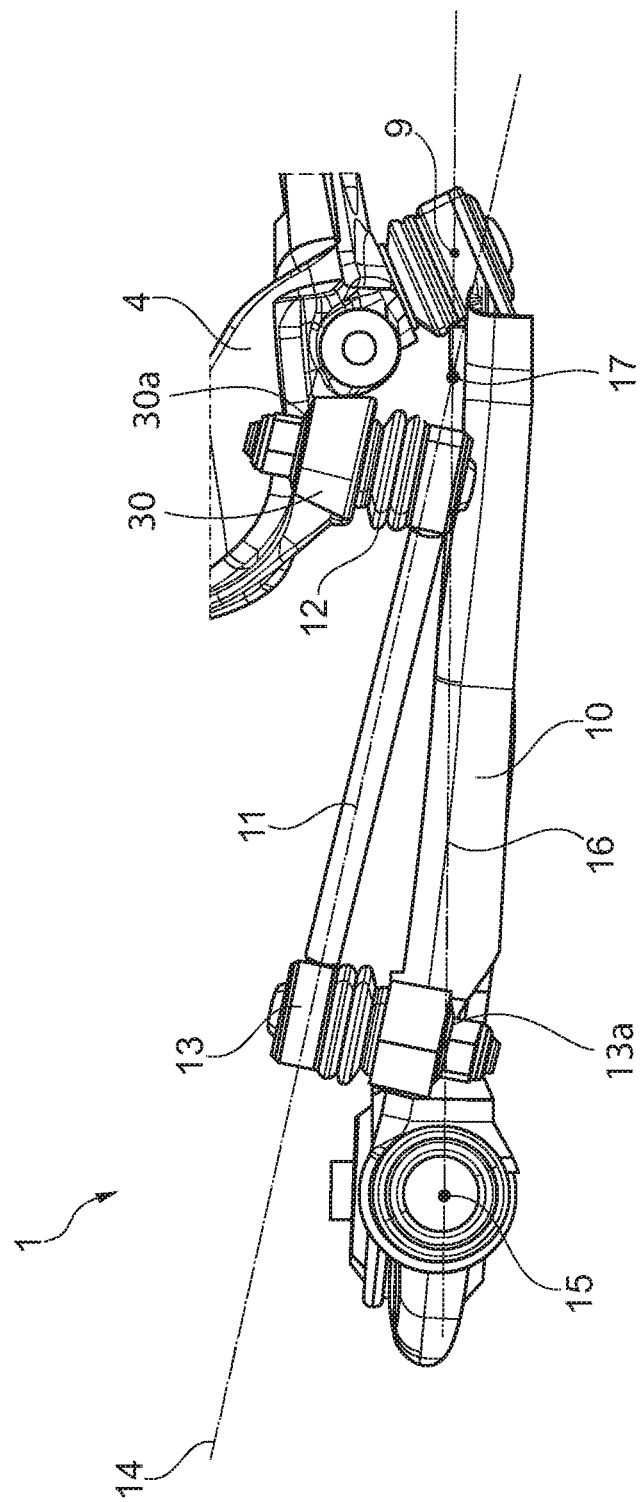
FIG. 2 illustrates a partial front view of the wheel suspension of FIG. 1 in a static initial position.

A lower portion of the carrier 4 is connected at a first joint 9 to a transverse control arm 10. The transverse control arm 10 of the wheel suspension 1 shown in FIG. 1 is configured to be substantially triangular. One side of the transverse control arm 10 mounted to the vehicle structure in a pivotally movable manner at pivot points or points of articulation 15 using front and rear pivot bearings. The front and rear pivot bearings form a front joint and a rear joint located generally in the direction of vehicle travel. In the exemplary embodiment of the wheel suspension 1, the carrier 4 mounts to the outer point or apex of the triangular-shaped transverse control arm 10 opposite the front and rear pivot points 15. As illustrated in FIGS. 2-4, the carrier 4 mounts on the transverse control arm 10 at joint 9 using an articulated joint, shown herein as a ball joint.

The wheel suspension 1 shown in FIG. 1 includes a rod-shaped control arm 11 connected on the carrier side, at a second joint 12, to the carrier 4, and connected on the transverse control arm side, at a third joint 13, to the transverse control arm 10. While identified as a rod-shaped control arm 11, other shapes or configurations of the control arm are also suitable and contemplated. Further, in the exemplary embodiment shown in FIG. 1, the joints 12 and 13 are ball joints.

FIG. 2 shows a partial front view of the wheel suspension 1 of FIG. 1 in a static position. The term "static," "static state," or "static position" as used herein means a state in which neither spring compression nor spring rebound of the wheel suspension occurs. FIG. 2 illustrates the wheel suspension components; in particular, of the transverse control arm 10 and the rod-shaped control arm 11, in a static position or state wherein neither spring compression nor spring rebound of the wheel suspension occurs. In the static state, illustrated in FIG. 2, the wheel suspension 1 is loaded by the weight of the vehicle.

FIG. 2 illustrates a front view of part of the wheel suspension 1, in particular the transverse control arm 10 and the rod-shaped control arm 11, viewing the wheel suspension 1 in the vehicle longitudinal direction from the front to the rear and substantially level with the transverse control arm 10. FIG. 2 illustrates a force application line 14 of the rod-shaped control arm 11 inclined toward a transverse control arm axis 16 of the transverse control arm 10. The transverse control arm axis 16 defined by a front point of articulation on the structure side, illustrated by the front pivot bearing 15 of the transverse control arm 10 on the structure side, and the articulated joint of the transverse control arm 10 and the carrier 4, illustrated as by ball joint 9. The force application line 14 and the transverse control arm axis 16 intersect at a point of intersection 17. As illustrated in FIG. 2, the point of intersection 17 is located, in the static position, between the point of articulation 15 of the transverse control arm 10 on the structure side and the articulated joint 9 of the transverse control arm 10 on the carrier side.

The force application line 14 of the control arm 11 is the line along which the force transmitted by the control arm 11 acts between the transverse control arm 10 and the carrier 4, the control arm 11 attached thereto in an articulated manner. The transverse control arm axis 16 within the meaning of the present invention is defined by the point of articulation 15 of the transverse control arm 10 on the structure side at which the transverse control arm 10 is attached in an articulated manner to the vehicle structure and the articulated joint 9 of the transverse control arm 10 on the carrier side at which the carrier 4 is attached in an articulated manner to the transverse control arm 10. If the transverse control arm 10 were to have more than one point of articulation on the vehicle structure, it is understood that the point of articulation of the transverse control arm is on the structure side furthest to the front in the vehicle longitudinal direction.

FIG. 3 illustrates a partial, front view of the wheel suspension 1 of FIG. 1 in a spring rebound position. FIG. 3 illustrates the wheel suspension components of FIG. 2, in particular the transverse control arm 10 and the rod-shaped control arm 11 in a full spring rebound position of the wheel suspension 1. As illustrated, the point of intersection 17 between the force application line 14 of the rod-shaped control arm 11 and the transverse control arm axis 16 of transverse control arm 10 is between the front point of articulation 15 of the transverse control arm 10 on the vehicle structure and the point of articulation 9 of the transverse control arm 10 on the carrier side. The point of intersection 17, at least over the entire spring path from the static position in FIG. 2 of the wheel suspension 1 to the full spring rebound position of the wheel suspension 1 in FIG. 3 is between the points 15 and 9.

FIG. 4 illustrates a partial front view of the wheel suspension 1 of FIG. 1 in a spring compression position. FIG. 4 shows the wheel suspension components of FIG. 2, in particular the transverse control arm 10 and the rod-shaped control arm 11 in a full spring compression position of the wheel suspension 1. As illustrated in FIG. 4, the force application line 14 of the rod-shaped control arm 11 in the full spring compression position extends substantially parallel to the transverse control arm axis 16 of the transverse control arm 10, which, however, is not necessarily required.

It is not required that the force application line 14 and the transverse control arm axis 16 intersect in every conceivable position of the wheel suspension components; for example, from the full spring compression position in FIG. 4, through the static position in FIG. 2, to the full spring rebound position in FIG. 3. Further, the point of intersection 17 of force application line 14 and the transverse control arm axis 16 in all these positions need not be between the points 15 and 9.

However, for achieving "wheel center recession" effect, the force application line 14 and the transverse control arm axis 16, in a front view of the transverse control arm 10 and the rod-shaped control arm 11, should intersect between the points 15 and 9 in the static position in FIG. 2.

By the specific positioning of the control arm 11 relative to the transverse control arm 10 it is possible, on the one hand, to control in a reliable manner rotation of the carrier 4 and the spring damper strut 6 connected thereto relative to the transverse control arm 10 in conventional driving situations of the vehicle, such as for example when accelerating, braking and during spring compression and spring rebound of the wheel suspension and the like. While on the other hand improving the kinematic behavior of the wheel suspension, in particular, such that a spring compression movement of the wheel suspension causes the recession of the wheel (so-called "wheel center recession"). "Recession" of the wheel is substantially understood as a movement of the wheel and/or the bearing element in the longitudinal direction of the vehicle to the rear during a spring compression movement of the wheel suspension. The wheel pulls back slightly to the rear during a spring compression movement of the wheel suspension, for example, when driving over an obstruction, whereby the hardness perceived by the occupant of the vehicle is reduced at the start of the spring compression movement and greater driving comfort is achieved.

Figure 5:
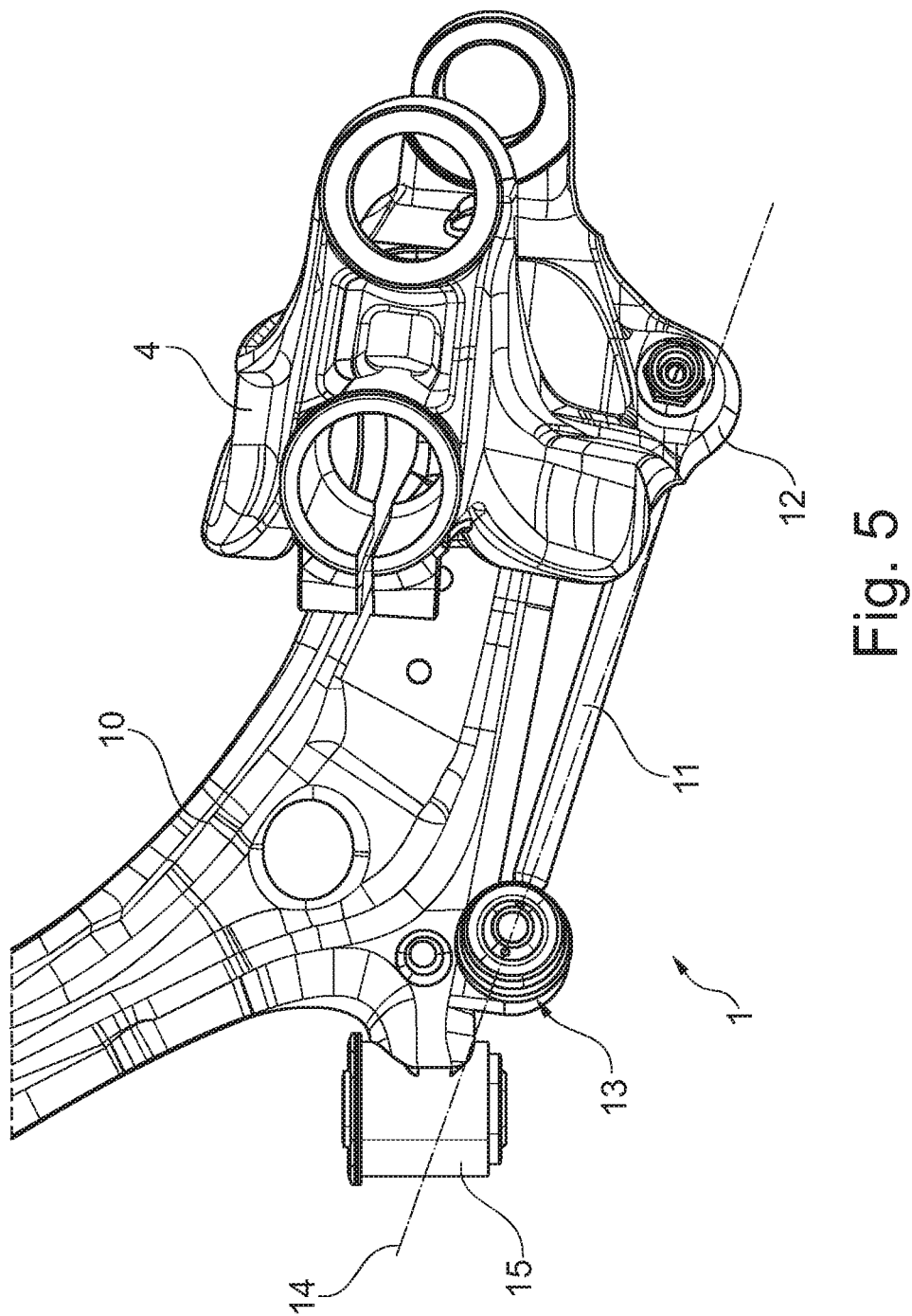
FIG. 5 illustrates a partial plan view of the wheel suspension of FIG. 1.

FIG. 5 illustrates a partial view of the wheel suspension 1 of FIG. 1 showing the transverse control arm 10 and the control arm 11 of the wheel suspension 1 viewed along a vehicle vertical axis from top to bottom. As shown, the force application line 14 of the rod-shaped control arm 11 in the plan view of the rod-shaped control arm 11 and the transverse control arm 10 intersects the point of articulation 15 of the transverse control arm 10 on the structure side. This avoids additional torques otherwise introduced by the rod-shaped control arm 11 into the point of articulation 15. As shown, the rod-shaped control arm 11 is arranged in the vehicle longitudinal direction in front of the transverse control arm 10. This arrangement provides the freedom of movement of the rod-shaped control arm 11 required for the spring compression and spring rebound movements of the wheel suspension 1.

Further, the position of the rod-shaped control arm 11 relative to the transverse control arm 10 may vary. As illustrated, the height or spacing of the joint 13 of the rod-shaped control arm 11 relative to the transverse control arm 10, near the front pivot joint/point of articulation on the vehicle side of the transverse control arm 10 is significant in determining the degree or amount of "wheel center recession." The extent of wheel center recession during spring compression of the wheel suspension 1 is described below with reference to FIGS. 6 and 7.

The point of intersection of the force application line and the transverse control arm axis according to the present invention is, in at least one predetermined position, between the point of articulation of the transverse control arm on the structure side and the articulated joint of the transverse control arm on the carrier side. Wherein the static position is defined by a static state—the absence of dynamic spring compression and spring rebound movements. The static position represents a position of the suspension components of the wheel suspension in an installed state on the vehicle the vehicle is in a static state when neither spring compression nor spring rebound movements occur. The specific positioning of the rod-shaped control arm relative to the transverse control arm in at least the static position causes a desired degree of recession of the wheel held on the bearing element of the wheel suspension during spring compression of the wheel suspension. The rod-shaped control arm operates to impart wheel recession, that is providing a built in desired amount or degree of wheel recession during spring compression of the wheel suspension.

FIG. 6 shows a schematic, kinematic view of the wheel suspension 1 of FIG. 1 moving from an initial static position, shown in phantom, to a spring compression position. The view shows the wheel suspension 1 in a front view similar to FIG. 2. In the static position the rod-shaped additional control arm 11, and thus its force application line 14 as described above, is inclined toward the transverse control arm axis 16, such that the point of intersection 17 between the force application line 14 and the transverse control arm axis 16 is between the points 15 and 9. FIG. 6, shows how the rod-shaped control arm 11 and the structural unit comprising the carrier 4 and spring damper strut 6 might move during a spring compression movement of the wheel suspension 1. Spring compression or a compressed position is defined as upward movement of the transverse control arm from the static position, in one example, movement of the transverse control arm 10 toward the spring damper strut 6 wherein the movement operates to compress the spring 8. As illustrated, the joint 13 of the rod-shaped control arm 11 on the transverse control arm side during the spring compression movement of the wheel suspension 1, in which the transverse control arm 10 pivots upward in the direction of the arrow 24 and about the point of articulation 15, moves along a movement path 18 which corresponds to a circular path about the point of articulation 15. As illustrated the joint 13 moves along the path 18 to position 13*.

The structural unit comprising the carrier 4 and the spring damper strut 6 pivots with the same spring compression movement, but about a virtual pivot point 20, due to the upper attachment 19 of the spring damper strut 6 to the vehicle structure. As illustrated in FIG. 1, the carrier 4 includes a projection 30 having a connection point/joint 30a. The rod-shaped control arm 11 connects to the carrier 4 at the projection 30, specifically connection point/joint 30a. Because the carrier 4 moves in a predetermined path, about the virtual pivot point 20, the projection 30 and correspondingly the connection point/joint 30a moves in a predetermined path. As illustrated, the connection point/joint 30a moves along a movement path 21, which corresponds to a circular path about the virtual pivot point 20. The articulated joint 12 is at the connection of the rod-shaped control arm 11 to the projection 30 of the carrier 4 at the connection point/joint 30a. As illustrated in FIG. 6a, when viewed separately, independent of the joint 13, the connection point/joint 30a, and correspondingly the rod-shaped control arm 11 connected thereto forming articulated joint 12, moves along the movement path 21 to a virtual articulated joint position 12*. Wherein the virtual articulated joint 12* position is determined by the location of the connection point/joint 30a.

However, as illustrated in FIG. 6a, the actual position of the articulated joint 12 in the spring compression state of the wheel suspension 1, resulting from spring compression movement of the rod-shaped control arm 11 and the position of the virtual articulated joint 12* of the carrier 4, resulting from spring compression movement of the structural unit including the carrier 4 and spring damper strut 6 about the pivot point 20, are different. As illustrated, the virtual articulated joint 12* is located further inward toward the virtual pivot point 20 than the actual articulated joint 12 of the rod-shaped control arm 11 because of the initial position/orientation of the rod-shaped control arm 11 with respect to the transverse control arm 10. Because the effective length of the control arm 11 is fixed and respective ends of the control arm 11 pivot about different points 15, 20 the relative movement or change in position is different for each end of the rod shaped control arm 11.

As illustrated, because the actual position of the articulated joint 12 extends further outward, rod-shaped control arm 11 exerts a force on the carrier 4. That is the rod-shaped control arm 11 presses the carrier 4 outwardly during a spring compression movement of the wheel suspension 1. The exerted force operating to rotate the carrier 4 about the joint 9 and correspondingly displacing the wheel center to the rear along the vehicle longitudinal axis whereby the wheel attached to the wheel suspension 1 correspondingly recedes—wheel center recession. The degree or amount of wheel center recession is determined based on the position of the rod-shaped control arm 11 and respective articulated joints 12, 13, on the carrier 4 and transverse control arm 10. Varying the distance or spacing of the articulated joint 13 from the transverse control arm axis 16 and front pivot joint/point of articulation 15 along with the angle of inclination, and correspondingly the point of intersection 17 between the force application line 14 and the transverse control arm axis 16 operates to vary the position of the articulated joint 12 with respect to the virtual articulated joint 12*. The variance in position determining the amount or degree of deflection of the carrier 4 and correspondingly the amount of the wheel center recession.

FIG. 7 shows a schematic, kinematic view of a second exemplary embodiment of a wheel suspension 22 according to the invention during a spring compression movement taking place from the static position, see FIG. 2. The view of FIG. 7 substantially corresponds to the view of FIG. 6 with the exception that the rod-shaped control arm 11 of the wheel suspension 22 is arranged lower, closer to the transverse control arm 10 than in the wheel suspension 1 shown in FIG. 6. As a result, the point of intersection between the force application line 14 of the rod-shaped control arm 11 and the transverse control arm axis 16 moves considerably closer to the point of articulation 15 of the transverse control arm 10. FIG. 7 illustrates that the joint 13 of the rod-shaped control arm 11 on the transverse control arm side in the wheel suspension 22 is arranged closer to the transverse control arm axis 16 than the joint 13 of the rod-shaped control arm 11 of the wheel suspension 1 on the transverse control arm side. Thus, the portion of the path covered on the movement path 18 of the joint 13 on the transverse control arm side, with the same spring compression path in FIG. 6, is correspondingly displaced downwardly. As a result, the difference, shown in FIG. 7A, between the actual articulated joint 12 of the rod-shaped control arm 11 and the virtual articulated joint 12* of the carrier 4 in the spring compression state of the wheel suspension 22 is further increased, whereby the recession of the wheel attached to the wheel suspension 22 is also increased. By fixing the height of the joint 13 of the rod-shaped control arm 11 on the transverse control arm side relative to the transverse control arm 10 and the joint 12 of the additional control arm 11 on the carrier side relative to the transverse control arm 10 and thus the position of the point of intersection between the force application line 14 of the additional control arm 11 and the transverse control arm axis 16 relative to the point of articulation 15 of the transverse control arm 10, the extent of the recession of a wheel attached to the wheel suspension 1 and/or 22 may be influenced in the desired manner.

As disclosed, the rod-shaped control arm 11 is arranged relative to the transverse control arm 10 such that, in a plan view of the rod-shaped control arm 11 and the transverse control arm 10 taken along the vehicle vertical axis from top to bottom, the force application line 14 of the rod-shaped control arm 11 intersects the point of articulation 15 of the transverse control arm 10 on the structure side. If the transverse control arm 10 were to have more than one point of articulation on the vehicle structure, the point of articulation of the transverse control arm 10 on the structure side is the point of articulation furthest to the front in the longitudinal direction of the vehicle. As a result, any additional loading of the transverse control arm 10, caused by the control arm 11 connected to the transverse control arm 10, is kept as low as possible. In particular, large additional torques caused by the control arm 11, as may occur for example during braking maneuvers, on the point of articulation of the transverse control arm on the structure side are avoided, as the force application line 14 of the control arm 11 according to this embodiment substantially intersects the point of articulation on the structure side and/or runs as close as possible thereto.

Further, as illustrated in FIG. 5, the rod-shaped control arm 11 is arranged relative to the vehicle longitudinal direction in front of the transverse control arm 10. This permits a low arrangement relative to the transverse control arm 10 of the articulated joint 13 of the rod-shaped control arm 11 on the transverse control arm, on the transverse control arm side. Preferably, the articulated joint 13 of the rod-shaped control arm 11 on the transverse control arm side is arranged near and/or in the transverse control arm 10 plane, which is a plane through the transverse control arm 10 substantially parallel to the road surface when the transverse control arm is installed in the vehicle. Thus the transverse control arm plane, for example in the case of a triangular transverse control arm, is generated by the three points of articulation (usually two points of articulation on the vehicle structure and one on the carrier). The transverse control arm axis already described above preferably extends in the transverse control arm plane.

The transverse control arm 10 is not limited to a triangular shape, but may have any shape suitable for the attachment of the carrier 4 to the vehicle structure, provided the control arm 11 can be connected in an articulated manner thereto. For the articulated attachment of the rod-shaped control arm 11 to the transverse control arm 10, on the one hand, and to the carrier ball joints are not necessary. In additional embodiments, instead of the ball joints, simple pivot joints, for example rubber bushings, could be provided for the articulated attachment of the control arm 11 to the transverse control arm 10 and/or to the carrier 4. Provided the pivot joints also permit a certain rotation about a pivot axis deviating from the actual pivot axis, to ensure the degree of freedom of the joints for the recession movement of the wheel held by the wheel suspension ("wheel center recession") during spring compression described herein, which however may be usually achieved by the known rubber bushings. The control arm 11, in contrast to the exemplary embodiment shown in the figures, may also be arranged in the vehicle longitudinal direction behind the transverse control arm, provided said transverse control arm provides sufficient constructional space for attaching the additional control arm, such as for example with a tilted L-shaped control arm.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A vehicle wheel suspension comprising:
a bearing element;
a carrier, said bearing element rotatably mounted on said carrier;
a spring damper strut connected to said carrier and supported on a vehicle structure;
a transverse control arm connected to the carrier and to the vehicle structure;
a control member connected at one end to the carrier and at the other end to the transverse control arm, said control member arranged relative to the transverse control arm such that in a front view of the control member and the transverse control arm, a force application line of the control member is inclined toward a transverse control arm axis defined by a point of articulation of the transverse control arm on the vehicle structure side and a point of articulation of the transverse control arm on the carrier side, such that a point of intersection of the force application line of the control member and the transverse control arm axis in a predetermined static position is between the point of articulation of the transverse control arm on the structure side and the point of articulation of the transverse control arm on the carrier side, between the end of the control member connected to the carrier and the point of articulation of the transverse control arm on the carrier side, and not between the end of the control member connected to the control arm and the end of the control member connected to the carrier, wherein between includes the respective ends of the control member.

2. The wheel suspension of claim 1 wherein the control member is arranged relative to the transverse control arm such that, in a plan view of the control member and the transverse control arm, the force application line of the control member intersects the point of articulation of the transverse control arm on the structure side.

3. The wheel suspension of claim 1 wherein the control member is arranged relative to a vehicle longitudinal direction in front of the transverse control arm.

4. The wheel suspension of claim 1 wherein the control member has an elongated rod-shaped configuration.

5. The wheel suspension of claim 1 wherein the control member is connected to the carrier via a ball joint.

6. The wheel suspension of claim 1 wherein the control member is connected to the transverse control arm via a ball joint.

7. A vehicle wheel suspension comprising:
a transverse control arm having first and second points of articulation and a control arm axis extending between said first and second points of articulation;
a carrier connected to said transverse control arm at said second point of articulation;
a control member having a force application line extending between first and second ends of said control member; and
said first end of said control member directly connected to said transverse control arm and said second end directly connected to said carrier such that in a static position the force application line and the control arm axis intersect at a point between said first and second points of articulation of said control arm, between said second end of said control member and said second point of articulation, and not between ends of said control member.

8. The wheel suspension of claim 7 wherein the control member is arranged relative to the transverse control arm such that, in a plan view of the control member and the transverse control arm, the force application line of the control member intersects a point of articulation of the transverse control arm on the structure side.

9. The wheel suspension of claim 7 wherein the control member is arranged relative to a vehicle longitudinal direction in front of the transverse control arm.

10. A vehicle wheel suspension comprising:
a transverse control arm having a structure side point of articulation and a carrier side point of articulation and a control arm axis extending between said structure side and carrier side points of articulation; and
a control member having a force application line extending between a first end of said control member connected to said control arm closer to said structure side point of articulation than said carrier side point of articulation and a second end connected to said carrier, a point of intersection between the control arm axis and the force application line located, in a static position, between the carrier side point of articulation and said second end of said control member and not between the first end of the control member and the second end of the control member.

11. The wheel suspension of claim 10 including:
said control member moving said carrier to a predetermined wheel recession position, said predetermined wheel recession position based on an initial position of said first end of said control member with respect to said control arm axis.

12. The wheel suspension of claim 10 wherein the control member is arranged relative to the transverse control arm such that, in a plan view of the control member and the transverse control arm, the force application line of the control member intersects a structure side point of articulation of the transverse control arm.

13. The wheel suspension of claim 10 wherein the control member is arranged relative to a vehicle longitudinal direction in front of the transverse control arm.

14. A vehicle wheel suspension comprising:
a transverse control arm having a structure side point of articulation and a carrier side point of articulation and a control arm axis extending between said structure side and carrier side points of articulation; and
a control member having a force application line extending between a first end of said control member connected to said control arm and a second end connected to said carrier;
said wheel suspension having a static position, a spring compression position and a spring rebound position;
the control arm axis and the force application line intersecting, in said static position, between said structure side and carrier side points of articulation and between the carrier side point of articulation and said second end of said control member;
the control arm axis and the force application line intersecting, in said spring rebound position, between said structure side and carrier side points of articulation and between the first end of the control member and the second end of the control member; and
the control arm axis and the force application line not intersecting, in said spring compression position, between said structure side and carrier side points of articulation.

* * * * *